United States Patent Office 3,546,265
Patented Dec. 8, 1970

3,546,265
PREPARATION OF CYCLIC SILOXANES
Richard Louis Schank, Brewster, N.Y., assignor to Union
Carbide Corporation, a corporation of New York
No Drawing. Filed Mar. 18, 1968, Ser. No. 714,052
Int. Cl. C07d 103/04; C07f 7/08
U.S. Cl. 260—448.2    21 Claims

ABSTRACT OF THE DISCLOSURE

A process for preparing cyclic siloxanes selected from the group consisting of hexamethylphenylhydrocarboncyclictetrasiloxane and octamethylphenylhydrocarboncyclicpentasiloxane which comprises cohydrolyzing at least three moles of a dimethyldihalosilane monomer and one mole of a phenylhydrocarbondihalosilane monomer at a temperature ranging from 40° C. to 70° C. in the presence of a diisopropylether solvent and wherein the mole amount of water employed is at least sufficient to provide a two phase hydrolysis system.

BACKGROUND OF THE INVENTION

This invention relates to a process for preparing a cyclic silicone compound containing both alkylsiloxy and arylsiloxy units. More particularly, this invention is directed to a novel process for the preparation of a cyclic siloxane containing at least one dimethylsiloxy unit and at least one phenylhydrocarbonsiloxy unit by direct hydrolysis of dimethyldihalosilane and phenylhydrocarbon dihalosilane monomers.

While the production of polydialkylcyclosiloxanes, such as octadimethylcyclosiloxane, by hydrolysis of dimethyldihalosilane is well known in the art, attempts to produce cyclic siloxanes containing both alkylsiloxy and phenylsiloxy units by cohydrolysis of the corresponding halosilane monomers, such as dimethyldichlorosilane and diphenyldichlorosilane have heretofore been found to be unsatisfactory due to the very low yield and impurity of any recovered cyclic siloxane containing both alkylsiloxy and phenylsiloxy units. Another disadvantage of such attempts has been the extremely low mole percent conversion of the highly costly phenyldihalosilane monomer starting reactants to the desired cyclic compounds, rendering such processes unsuitable from an economic standpoint.

SUMMARY OF THE INVENTION

It has now been discovered that the above disadvantages may be overcome and that cyclic siloxanes containing both methylsiloxy and phenylsiloxy units can be prepared in high yields and purity by the instant invention which comprises cohydrolysis of dimethyldihalosilane and phenylhydrocarbondihalosilane monomers in the presence of diisopropyl ether at moderate temperatures, as herein described below.

Therefore, it is an object of this invention to provide an efficient and economical process for preparing a distillable cyclic siloxane compound containing both methylsiloxy and phenylsiloxy units. Another object is to provide a process in which the desired cyclic siloxane products may be recovered in greatly increased yields and purity. Still another object is to provide an economical process in which there is a very high mole percent conversion of the phenylhydrocarbondihalosilane to the desired cyclic siloxane products. Other objects and advantages will become readily apparent from the following descriptions and appended claims.

More specifically the instant invention may be described as a process for preparing a cyclic siloxane selected from the group consisting of hexamethylphenylhydrocarboncyclictetrasiloxane and octamethylphenylhydrocarboncyclicpentasiloxane (i.e., $$[(CH_3)_2SiO]_3[\phi \overset{R}{\underset{|}{Si}}O] \text{ and } [(CH_3)_2SiO]_4[\phi \overset{R}{\underset{|}{Si}}O]$$

wherein $\phi$ represents a phenyl, ($C_6H_5$), radical and R represents a phenyl, ($C_6H_5$), or a methyl radical which comprises cohydrolyzing, at least 3 moles of a methylhalosilane monomer of the formula:

$$(CH_3)_2SiX_2$$

wherein X represents a halogen atom, and about 1 mole of a phenylhalosilane monomer of the formula:

$$\overset{R}{\underset{|}{\phi SiX_2}}$$

wherein $\phi$, R and X are the same as defined above at a temperature ranging from about 40° C. to about 70° C., in the presence of diisopropyl ether, and wherein the amount of water employed is at least sufficient to provide a two phase hydrolysis system.

DESCRIPTION OF THE PREFERRED EMBODIMENTS

In order to obtain the desired economical benefits of the instant process, namely, high yields and purity of the desired cyclic products, as well as a high mole percent conversion of the very costly phenylhalosilane monomer starting materials to the desired cyclic siloxane products, there are several critical features of the process, as discussed more fully below, that must be complied with.

As pointed out above, one of the halosilane monomers used as a reactant in the process of this invention is a dimethyldihalosilane having the formula:

$$(CH_3)_2SiX_2$$

wherein X represents a halogen atom, such as chlorine, bromine and iodine. Such compounds as well as their production are well known in the art. Of course, it should be understood that each X individually represents a halogen atom so that the halogens may be the same or different. Illustrative examples of specific halosilane monomers that may be mentioned are, for example dimethyldichlorosilane, dimethyldibromosilane, dimethyldiiodosilane, dimethylchlorobromosilane and the like. Moreover, if desired, one may employ a mixture of such halosilane compounds. The most preferred reactant is dimethyldichlorosilane.

The other halosilane monomer used as a reactant in the instant process is a phenylhydrocarbondihalosilane having the formula:

$$\overset{R}{\underset{|}{\phi SiX_2}}$$

wherein $\phi$ represents a phenyl radical; R represents a methyl or phenyl radical and X represents a halogen atom, such as chlorine, bromide and iodine. Such compounds as well as their production are well known in the art. Again it should be understood that each X individually represents a halogen atom so that the halogens may be the same or different. Illustrative examples of specific halosilane monomers that may be mentioned, are for example, phenylmethyldichlorosilane, phenylmethyldibromosilane, phenylmethyldiiodosilane, phenylmethylchlorobromosilane, diphenyldichlorosilane, diphenyldibromosilane, diphenyldiiodosilane, diphenylchlorobromosilane and the like. Moreover, if desired, one may employ a mixture of such halosilane compounds. The preferred reactants are the chlorosilanes, while the most preferred reactant is diphenyldichlorosilane.

The mole ratio of dimethyldihalosilane monomer to phenylhydrocarbondihalosilane monomer must be at least 3 to 1. Generally it is preferred to employ about 3 to 7 moles of the dimethyldihalosilane for about every mole of phenylhydrocarbondihalosilane employed, while the most preferred mole ratio is about 5 to 1. Higher mole ratios than 7 to 1 may be used, if desired, but have been found only to reduce the kettle yield of the desired cyclic products without significantly increasing the mole percent conversion of phenyl monomer to the desired cyclic siloxanes.

The minimal amount of water employed in the cohydrolysis reaction of this invention is also critical and must be at least that amount sufficient to provide a two phase hydrolysis system with the diisopropyl ether. In other words, at least an excess amount of water to that mole amount stoichiometrically necessary for complete hydrolysis of the halosilane monomers must be employed. While the upper limit on the amount of water used is not critical, generally it is preferred that the amount of water employed range from about a 40 mole percent excess up to about a 150 mole percent excess of that amount of water stoichiometrically necessary to hydrolyze all the halogen atoms of the silane monomer employed. The preferred amount of water is about a 50 mole percent excess. Since hydrochloric acid is formed during the hydrolysis process, the water employed may be supplied in the form of concentrated hydrochloric acid, if desired.

The amount of diisopropyl ether solvent employed in the instant process may range from at least about 25 percent by weight, preferably about 29 percent by weight, up to about 75 percent by weight, or higher if desired, of the sum total amount by weight of the halosilane monomers employed. For example, if the sum total amount of halosilane monomers employed is 100 grams, then at least about 25 grams of diisopropyl ether must be used. The use of diisopropyl ether is indeed unique, since the use of other ether solvent systems have not been found to produce the beneficial results reported herein.

The reaction temperature of this hydrolysis process is also critical and must be at least about 40° C. for satisfactory yields of the desired cyclic siloxanes to be obtained. More specifically, the reaction temperature may range from 40° C. to 70° C., while the preferred temperature range is about 50° C. to 55° C.

The order of addition of the reaction ingredients is not critical so long as the cohydrolysis is carried out in accordance with the above prescribed conditions. For example, the halosilane monomers may be added to the aqueous-ether solution simultaneously as a mixture or separately. Similarly the halosilanes may be first dissolved in the diisopropyl ether solvent and then added to water or to an aqueous —HCl solution, or if desired, a proportion of the ether solvent may be present as a part of the halosilane feed and the other portion of the ether may be present as a part of the aqueous solution. Generally, the process of this invention is typically conducted as follows: An aqueous diisopropylether solution containing at least a sufficient amount of water to provide a two phase hydrolysis system is employed as the charge and heated to a temperature of at least about 40° C. To this charge is added a mixture of dimethyldihalosilane and phenylhydrocarbondihalosilane dissolved in the remaining amount of diisopropyl ether and the entire mixture is agitated and allowed to react until the desired cyclic products are formed. Additional amounts of water may be supplied during the reaction if desired. Upon completion of the reaction the desired cyclic siloxanes may be easily recovered by any appropriate method. For example, by draining off the aqueous —HCl bottom layer of the reaction mixture and washing and neutralization of the cyclic siloxaneether layer, if desired, followed by solvent stripping and fractional distillation at reduced pressure to recover the desired cyclic siloxanes of this invention from the lower and higher boiling silicone cyclics.

The desired siloxane products of this invention, i.e., the tetramer

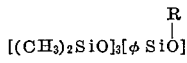

cyclic compound and the pentamer

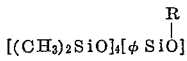

cyclic compound are recovered as a crystal clear liquid mixture having a general purity of at least 95 percent and wherein the ratio of the tetramer compound to the pentamer compound in the distilled fraction is generally about 4 to 1. Said desired cyclic products prepared by the present invention are unique for while the tetramer and pentamer compounds may be separated by known methods if desired, such is not necessary since the cyclic mixture can be employed as a lubricant, as a dispersing agent for fillers in rubber compositions and is particularly useful as an intermediate for preparing conventional linear siloxane copolymers containing phenyl radicals over a wide range of molecular weights ranging from oils and fluids to vulcanizable gumstocks by conventional base-catalyzed siloxane rearrangement (equilibration) reactions. For example, the employment of the instant cyclic products are liquid, distillable and readily soluble in octamethylcyclotetrasiloxane and other dimethylsiloxane materials and such eliminates the heretofore difficult step of compounding the highly insoluble solid octaphenylcyclotetrasiloxane compound into said octamethyl siloxane prior to producing the conventional linear siloxane products. Moreover, the simplified blending of the instant products with the dimethylsiloxane charge for preparing linear copolymers renders it easy to obtain the desired type and molecular weight linear copolymer desired. In addition the relative low-viscosity of the instant liquid cyclic products makes it very easy to handle and pump said liquids.

The following examples are illustrative of the present invention and are not to be regarded as limitative. It is to be understood that all parts, percentages and proportions referred to herein and in the appended claims are by weight unless otherwise indicated.

EXAMPLE 1

A charge of 130.0 grams of water and about 165 grams of diisopropylether were placed into a 2-liter, 3-necked flask equipped with a stirrer, heating mantel, dropping funnel, thermometer, water condenser and thermo-watch to control the temperature. The kettle charge was heated to 50°–55° C. and a feed consisting of 127.0 grams (0.5 mole) of diphenyldichlorosilane and 323 grams (2.5 moles) of dimethyldichlorosilane in about 165 grams of diisopropylether were slowly added dropwise to the agitated kettle contents and the reaction temperature maintained at 55°–65° C. The reaction contents were allowed to react for an additional thirty minutes after the feed addition was completed. The completed reaction mixture was then cooled to about 40° C., thoroughly washed, and the bottom layer of aqueous —HCl drained off. The cyclic silicone ether layer was then solvent stripped and the cyclic siloxane mixture vacuum distilled to yield about 162 grams of the desired crystal clear liquid mixture of tetramer and pentamer cyclic siloxanes. Analysis showed the desired mixture to have a refractive index at 25° C. of about 1.4850 and consisting of about 122 grams of hexamethyldiphenylcyclictetrasiloxane, i.e.,

and about 40 grams of octamethyldiphenylcyclicpentasiloxane, i.e.,

The mole conversion of diphenyldichlorosilane to desired cyclic siloxanes was found to be about 68.5 percent by ultraviolet analysis. Similar results may be produced by replacing the above dimethyldichlorosilane monomer with other halo monomers, such as dimethyldibromosilane, dimethyldiiodosilane, dimethylchlorobromosilane and the like, and/or replacing the above diphenyldichlorosilane monomer with other halo monomers, such as diphenyldibromosilane, diphenyldiiodosilane, diphenylchlorobromosilane and the like.

EXAMPLE 2

The procedure of Example 1 was repeated except that a mole ratio of dimethyldichlorosilane to diphenyldichlorosilane of about 7 to 1 was employed and the yield of desired crystal clear liquid cyclics amounted to about 124 grams of hexamethyldiphenylcyclictetrasiloxane and 31 grams of octamethyldiphenylcyclicpentasiloxane. Analysis also showed that the mole percent conversion of diphenyldichlorosilane monomer to desired cyclic siloxanes was about 69 percent and the boiling point range of said mixture was about 135° C.–145° C./1.0 mm. Hg.

EXAMPLE 3

The procedure of Example 2 was repeated except that the total amount of diisopropyl ether solvent employed was only about 165 grams. The yield of desired mixed cyclics was about 131 grams, 78% of which was hexamethyldiphenylcyclictetrasiloxane and about 22% of which was octamethyldiphenylcyclicpentasiloxane. The mole percent conversion of the diphenyldichlorosilane monomer to desired cyclic siloxanes was about 58.5 percent and the refractive index of said mixture was about 1.4855 at 25° C.

EXAMPLE 4

The procedure in Example 1 was repeated except that the reaction temperature was maintained at about 40° C. to 42° C. and similar results were obtained. About 118 grams of hexamethyldiphenylcyclictetrasiloxane and about 34 grams of octamethyldiphenylcyclicpentasiloxane were obtained. The mole conversion of diphenyldichlorosilane to desired cyclic siloxanes was about 67.5 percent. The desired cyclic siloxane mixture had a refractive index of about 1.4853 at 25° C.

EXAMPLE 5

The procedure in Example 1 was repeated except that the water in the kettle charge was supplied in the form of concentrated hydrochloric acid and the reaction temperature was maintained at about 50° C. to 55° C. The yield of desired cyclic siloxanes amounted to about 175 grams, 79% of which was hexamethyldiphenylcyclictetrasiloxane and 21% octamethyldiphenylcyclicpentasiloxane, while the refractive index of the mixture was about 1.4854 at 25° C. The mole percent conversion of diphenyldichlorosilane to desired cyclic siloxanes was about 79 percent.

EXAMPLE 6

By way of comparison the procedure of Example 1 was repeated except that the temperature was maintained at about 15° C. The amount of desired tetramer and pentamer cyclic siloxanes was only about 83 grams and the mole percent conversion of diphenyldichlorosilane monomer to desired cyclic siloxanes was only about 36.0 percent.

EXAMPLE 7

The procedure of Example 1 was repeated except that phenylmethyldichlorosilane was employed as the monomer instead of diphenyldichlorosilane. The mole percent conversion of the phenylmethyldichlorosilane to desired cyclic siloxanes was about 42 percent and about 108 grams of product mixture was obtained having a boiling point range of about 82° C.–140° C./3.0 mm. Hg.

Similar results may be obtained by replacing the above phenylmethyldichlorosilane monomer with other halosilanes, such as phenylmethyldibromosilane, phenylmethyldiiodosilane and phenylmethylchlorobromosilane and the like.

EXAMPLE 8

The procedure in Example 1 was repeated except that the reaction mixture contained about 87.0 grams of water, 234.0 grams of diisopropyl ether and 321.0 grams of dimethyldichlorosilane and diphenyldichlorosilane in a mole ratio of three to one and was hydrolyzed at a reaction temperature of 50° to 55° C. About 99.0 grams of hexamethyldiphenylcyclictetrasiloxane and about 25.0 grams of octamethyldiphenylcyclicpentasiloxane as a clear liquid mixture having a refractive index at 25° C. of about 1.4860 were obtained. The mole conversion of diphenyldichlorosilane to desired cyclic siloxanes was found to be about 57 percent.

EXAMPLE 9

The procedure in Example 1 was repeated except that the reaction mixture contained a total of about 131.0 grams of diisopropyl ether divided equally between the kettle charge and chlorosilane feed mix. About 140.0 grams of the desired hexamethyldiphenylcyclictetrasiloxane and octamethyldiphenylcyclicpentasiloxane mixture were isolated by distillation. The mole percent conversion of the diphenyldichlorosilane monomer to desired cyclic siloxanes was about 58.5 percent.

EXAMPLE 10

The procedure in Example 1 was repeated except that only about 81.0 grams of water were used. Distillation in the usual manner yielded 158.0 grams of the desired mixed cyclic fraction of hexamethyldiphenylcyclictetrasiloxane and octamethyldiphenylcyclicpentasiloxane, which had a refractive at 25° C. of 1.4862. The mole percent conversion of the diphenyldichlorosilane starting material to desired cyclic siloxanes was found to be about 72.5 percent by chromatographic analysis.

Various modifications and variations of this invention will be obvious to a worker skilled in the art and it is understood that such modifications and variations are to be included within the purview of this application and the spirit and scope of the appended claims.

What is claimed is:

1. A process for preparing cyclic siloxanes selected from the group consisting of:

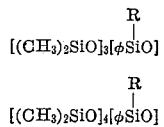

which comprises cohydrolyzing at least about 3 moles of a methylhalosilane monomer of the formula:

$$(CH_3)_2SiX_2$$

wherein X represents a halogen atom; and about 1 mole of a phenylhalosilane monomer of the formula:

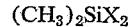

wherein X represents a halogen atom, wherein $\phi$ represents a phenyl radical and wherein R represents a radical selected from the group consisting of methyl and phenyl radicals, at a temperature ranging from about 40° C. to about 70° C., in the presence of a diisopropyl ether solvent, the amount of said ether being at least about 25 percent by weight of the sum total amount by weight of the halosilane monomers employed and wherein the mole amount of water employed is at least sufficient to provide a two phase hydrolysis system.

2. A process as defined in claim 1 wherein R represents a phenyl radical.

3. A process as defined in claim 1, wherein R represents a methyl radical.

4. A process as defined in claim 1, wherein the reaction is conducted at a temperature ranging from about 50° C. to 55° C.

5. A process as defined in claim 1, wherein the cohydrolysis is carried out in the presence of concentrated hydrochloric acid.

6. A process as defined in claim 1, wherein the mole ratio of methylhalosilane monomer to phenylhalosilane monomer ranges from about 3-7 to 1.

7. A process as defined in claim 1, wherein the amount of diisopropyl ether employed ranges from about 29 percent by weight up to about 75 percent by weight of the sum total amount by weight of the halosilane monomers employed.

8. A process as defined in claim 6 wherein the ratio is about 5 to 1.

9. A process as defined in claim 1, wherein X represents a chlorine atom.

10. A process as defined in claim 1, wherein the mole amount of water employed ranges from about a 40 percent excess up to about a 150 percent excess of that mole amount of water stoichiometrically necessary to hydrolyze all the halogen atoms of the silane monomers employed.

11. A process as defined in claim 10, wherein the mole amount of water employed is about a 50 percent excess.

12. A process as defined in claim 10, wherein the cohydrolysis is carried out in the presence of concentrated hydrochloric acid.

13. A process as defined in claim 1, for preparing a cyclic siloxane having the general formula:

$$[(CH_3)_2SiO]_x[(\phi)_2SiO]$$

wherein $\phi$ represents a phenyl radical and $x$ represents an integer of 3 or 4, which comprises cohydrolysis of a methylchlorosilane of the formula:

$$(CH_3)_2SiCl_2$$

and a phenylchorosilane of the formula:

$$(\phi)_2SiCl_2$$

wherein $\phi$ is the same as defined above.

14. A process as defined in claim 13, wherein the cohydrolysis is carried out in the presence of concentrated hydrochloric acid.

15. A process as defined in claim 13 wherein $x$ is 3.

16. A process as defined in claim 13 wherein $x$ is 4.

17. A process as defined in claim 13, wherein the temperature employed is in the range of about 50° C. to 55° C.; wherein the mole ratio of methylchlorosilane monomer to phenylchlorosilane monomer is about 5 to 1.

18. A process as defined in claim 17, wherein the cohydrolysis is carried out in the presence of concentrated hydrochloric acid.

19. A process as defined in claim 17, wherein the mole amount of water employed ranges from about 40 percent excess up to about a 150 percent excess of that mole amount of water stoichiometrically necessary to hydrolyze all the halogen atoms of the silane monomers employed.

20. A process as defined in claim 19, wherein the mole amount of water employed is about a 50 percent excess.

21. A process as defined in claim 17, wherein the amount of diisopropyl ether employed ranges from about 29 percent by weight up to about 75 percent by weight of the sum total amount by weight of the halosilane monomers employed.

References Cited
UNITED STATES PATENTS

| | | | |
|---|---|---|---|
| 2,758,124 | 8/1956 | Schwenker | 260—448.2 |
| 3,317,578 | 5/1967 | Prescott et al. | 260—448.2 |
| 3,332,972 | 7/1967 | Brown | 260—448.2 |
| 3,340,287 | 9/1967 | Sporck | 260—448.2 |
| 3,358,009 | 12/1967 | Omietanski et al. | 260—448.2 |
| 3,398,173 | 8/1968 | Goosens | 260—448.2 |
| 3,424,779 | 1/1969 | Wu | 260—448.2 |

TOBIAS E. LEVOW, Primary Examiner

P. F. SHAVER, Assistant Examiner